(12) United States Patent
Pera et al.

(10) Patent No.: US 8,902,863 B2
(45) Date of Patent: Dec. 2, 2014

(54) WIRELESS NETWORK COMMUNICATION SYSTEM AND METHOD

(71) Applicants: Robert J Pera, San Jose, CA (US); Sriram Dayanandan, Santa Clara, CA (US)

(72) Inventors: Robert J Pera, San Jose, CA (US); Sriram Dayanandan, Santa Clara, CA (US)

(73) Assignee: Ubiqviti Networks, Inc., San Jose, CA (US)

(*) Notice: Subject to any disclaimer, the term of this patent is extended or adjusted under 35 U.S.C. 154(b) by 0 days.

(21) Appl. No.: 13/734,956

(22) Filed: Jan. 5, 2013

(65) Prior Publication Data

US 2013/0128869 A1  May 23, 2013

Related U.S. Application Data

(63) Continuation of application No. 12/534,120, filed on Aug. 1, 2009, now Pat. No. 8,400,997.

(51) Int. Cl.
*H04W 74/06* (2009.01)
*H04L 12/863* (2013.01)

(52) U.S. Cl.
CPC .............. *H04W 74/06* (2013.01); *H04L 47/50* (2013.01)
USPC ....................................................... 370/336

(58) Field of Classification Search
CPC ......... H04L 47/10; H04L 47/50; H04L 49/90; H04L 47/2441; H04L 47/6215; H04L 12/5693; H04L 2012/5681; H04W 74/06
USPC ......... 370/311, 329, 341, 346, 386, 203, 331, 370/336, 349, 412; 364/200
See application file for complete search history.

(56) References Cited

U.S. PATENT DOCUMENTS

| 4,251,865 | A  | * | 2/1981 | Moore et al. ................... | 710/109 |
|---|---|---|---|---|---|
| 8,503,283 | B2 | * | 8/2013 | Kafle et al. ...................... | 370/203 |
| 2002/0031119 | A1 | * | 3/2002 | Brouet et al. .................. | 370/386 |
| 2004/0156350 | A1 | * | 8/2004 | Brasic et al. ................... | 370/346 |
| 2005/0025081 | A1 | * | 2/2005 | Wakamatsu ................... | 370/311 |
| 2006/0062181 | A1 | * | 3/2006 | Chou ............................ | 370/329 |
| 2007/0097941 | A1 | * | 5/2007 | Le et al. ......................... | 370/341 |
| 2008/0186918 | A1 | * | 8/2008 | Tinnakornsrisuphap et al. .............................. | 370/331 |
| 2010/0220673 | A1 | * | 9/2010 | Hui et al. ....................... | 370/329 |
| 2012/0033634 | A1 | * | 2/2012 | Spinar et al. .................. | 370/329 |

* cited by examiner

*Primary Examiner* — Obaidul Huq
*Assistant Examiner* — Syed M Bokhari
(74) *Attorney, Agent, or Firm* — Antero & Tormey LLP; Pete Tormey

(57) ABSTRACT

A communication system comprising one or more wireless stations programmed to await for an authorizing signal to initiate wireless communications with a network controller or access point. The network controller maintains identification information in different queues, and polls stations from those queues. The wireless station identification information may be moved between the different queues in response to wireless station activity. Between polling, each mobile station aggregates data for the next opportunity to transmit. Multi-polling may be employed such that more than a single station is polled at a time. Polling is accomplished by polling one of the more stations from each queue having the effect that stations in one queue are polled more often than those in another queue. If a lesser active station becomes active, it may be moved into the shorter queue and consequently will be polled more often.

19 Claims, 3 Drawing Sheets

WIRELESS NETWORK COMMUNICATION SYSTEM AND METHOD

PRIORITY

This application claims the benefit of U.S. patent application Ser. No. 12/534,120 entitled "Wireless Network Communication System and Method" by the same inventors filed on Aug. 1, 2009 which is incorporated by reference as if fully set forth herein.

BACKGROUND

The present invention relates generally to a system and method for wireless communications and more particularly to a method for wireless digital communications between multiple nodes located at a distance from each other.

In wireless communication, devices send and receive messages (data flows) through radio or other means without being physically connected. Wireless devices may include portable computers, cellular telephones, personal digital assistants (PDAs), communications equipment, location sensors and the like. Mobile processing devices with wireless communication capability can be coupled to a computer network, such as the Internet or the World Wide Web. The IEEE 802.11 standards (including IEEE 802.11a, IEEE 802.11b, IEEE 802.11g, and IEEE 802.11n) include known techniques for coupling wireless devices (which might be mobile stations) to a computer network. In the IEEE 802.11 standard, wireless devices seek out and select "access points" (herein sometimes called "AP's"). Each wireless device associates itself with a particular AP, with which it communicates. Each mobile station determines from time to time if it has good communication with its associated AP, and whether it would have better communication with a different AP. As a result of this determination, mobile stations may associate with another AP.

Access points exhibit a known deficiency when servicing data flows from different mobile stations. Because multiple devices may operation on a given frequency, data collisions occur when two or more mobile stations attempt to transmit at the same time. Accordingly, wireless standards have collision avoidance and correction mechanisms to reduce the negative impact of data collisions and to recover from them when they occur. Generally, the collision avoidance systems involve a random delay time such that each station waits a random amount of time before attempting to transmit. In most cases, this allows for one station to transmit first and not collide with the other station. In wireless networks covering a wide area, collision avoidance systems are less affective because each mobile station may be too far away from neighboring mobile stations to sense when the neighboring station is transmitting. Therefore, when two or more mobile stations transmit they are unaware of the other station's transmissions and will not effectuate collision avoidance procedures.

Additionally, because the IEEE 802.11 standards require backward compatibility, differing wireless devices may be connected to the access points using different transmission speeds. Consequently slower devices require more "air time" to transmit the same amount of information as compared to newer, higher bandwidth devices. Since air time, by necessity, must be shared among the differing wireless devices that utilize the same access point, a slower wireless device causes a general slowdown for other devices operating with the access point. This slowdown adversely impacts systems where the quality of service (QoS) is important such as digital voice systems. In digital voice systems, transmission latency may provide a degradation of service that is apparent to a listener.

SUMMARY

Disclosed herein is a communication system comprising one or more wireless stations (or mobile stations), programmed to await for an authorizing signal (poll) to initiate wireless communications with a network controller or access point. The network controller maintains identification information in different queues, said queues based upon the wireless station's activity. The wireless station identification information is moved between the different queues in response to wireless station activity, so the more active stations are maintained in one queue and polled more often, while less active stations are maintained in a second queue and polled less often. Between polling, each mobile station aggregates data for the next opportunity to transmit.

Multi-polling may be employed such that more than a single station is polled at a time. Polling is accomplished by polling one of the more active station along with a less active station. The less active station is unlikely to transmit, so collisions are avoided to a certain degree. If a lesser active station becomes active, it is moved into the more active queue and consequently will be polled more often. This has the affect of giving less active stations fewer opportunities to communicate with the network controller than more active stations. Additionally, polling may be regulated according to either amount of data or the amount of airtime required to transmit.

Polling multiple stations may also be accomplished by polling lower activity stations while simultaneously communicating data traffic with more active stations having the affect of not simultaneously polling, but instead polling certain stations while passing data with others.

The construction and method of operation of the invention, however, together with additional objectives and advantages thereof will be best understood from the following description of specific embodiments when read in connection with the accompanying drawings.

DESCRIPTION

Generality of Invention

Figure 1:
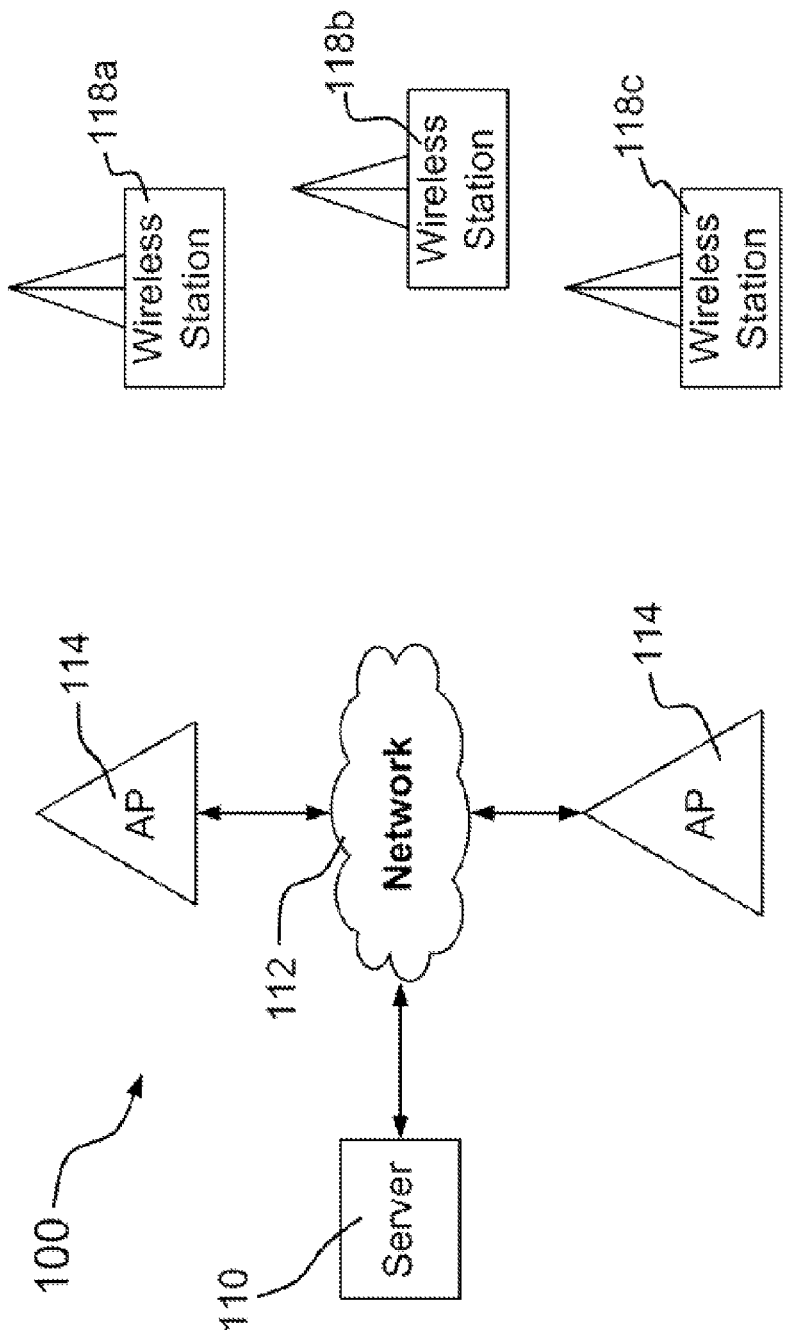
FIG. 1 shows a functional diagram of a wireless network.

This application should be read in the most general possible form. This includes, without limitation, the following:

References to specific techniques include alternative and more general techniques, especially when discussing aspects of the invention, or how the invention might be made or used.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is not limited to the specifics of any particular embodiments and examples disclosed herein. Many other variations are possible which remain within the content, scope and spirit of the invention, and these variations would become clear to those skilled in the art after reading this application.

Lexicography

Read this application with the following terms and phrases in their most general form. The general meaning of each of these terms or phrases is illustrative, not in any way limiting.

The phrase "processing device" generally refers to an electronic device capable of being programmed to execute instructions. These instructions may be stored in memory for execution by the processor, or the processing device may be configured to execute instructions directly. A processing device generally includes a form of input/output such that the results of the processing are made available for further processing or to perform a task in another stage of processing. A processing device is made operable by providing and or executing instructions.

The phrase "access point", the term "AP", and the like, generally refer to devices capable of wireless communication with wireless devices and capable of either wired or wireless communication with other devices. In some embodiments, AP's communicate with external devices using a local network. However, there is no particular requirement that AP's have an actual wired communication link; AP's might communicate entirely wirelessly.

The phrases "incoming message" and "received frame" generally refer to a message packet or message frame sent by a wireless device or wireless station to an AP. In the preferred embodiment these phrases refer to a frame sent by a wireless station to an AP under 802.11 wireless communication standards. The incoming message may be a unicast frame (intended for a single AP) or a multicast frame (intended for multiple AP's).

The phrases "outgoing message" and "transmit frame" generally refer to a message packet or message frame being sent to a wireless device or wireless station from an AP. In the preferred embodiment these phrases refer to a frame sent by an access point to a wireless device under 802.11 wireless communication standards. The outgoing message may be a unicast frame or a multicast frame.

The phrase "wireless communication" and the like, generally refers to radio frequency or other electromagnetic communication. In preferred embodiments, wireless communication includes a wireless communication standard such as IEEE 802.11a, 11b, 11g, or 11n. However, in the context of the invention, there is no particular requirement that wireless communication or a communication network must necessarily (1) use radio spectrum, (2) use electromagnetic communication, or even (3) be entirely confined to untethered communication coupling.

The phrases "wireless device", "wireless station", "mobile station" and the like, generally refer to devices capable of wireless communication with AP's. In some embodiments, wireless devices implement a wireless communication standard such as IEEE 802.11a, 11b, 11g, or 11n. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use inter-compatible communication standards.

The phrase "data flow" generally refers to a grouping of digital traffic. The grouping generally is identified by a combination of headers and footers indicating source address, destination address, source port, and destination port along with the transmitted data and other control signals. In effect, all traffic matching a specific combination of these values is logically grouped together into a data flow. A data flow can represent a single TCP connection between two computing devices. Data flows are generally characterized by both a downlink portion and an uplink portion. The uplink portion can be characterized as an incoming message as described above, whereas the downlink portion flows in the opposite direction.

The phrases "air time", "on air time" or "airtime" generally refer to a duration of a specific transmission for a wireless network. This duration may be the time is takes to transmit an outgoing message or the time it takes to receive an incoming message. The airtime may be actual, wherein the airtime is measured from a transceiver, or calculated based on the size of the message and the expected broadcast rate.

System Elements

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 shows a functional diagram of a wireless network. The wireless network includes both fixed and mobile stations. A server 110 connects to the network 112 for providing file access services. The network 112 connects in turn to one or more access points 114. The access points 114 provide wireless communications through links to one or more mobile stations (or wireless devices) 118a-118c. Each wireless device is connected to the access point 114 according to the protocol inherent in the design of the wireless device, for example 802.11 or others. The protocols may have different speeds or data rates for transmitting and receiving data between the wireless device 118 and the access points 114. During wireless operation the data rate may change to reduce the impact of any interference or to account for other conditions.

In operation each wireless device 118 connects to the access point 114 through its own protocol establishing the communication rate for the wireless network. The access point 114 is a processing device having a memory which may use both wireless communications of hard wired communications as an input-output means. Once the communication rate is established, data from the server 110 is coupled to the wireless device 118 through the network and the access point 114 allowing communications to occur.

Digital communications devices conventionally operate with a multi-layer configuration generally consisting of the Application, Presentation, Session, Transport, Network, Data Link, and Physical layers. A layer is a collection of related functions that provides services to the layer above it and receives services from the layer below it. For example, a layer that provides error-free communications across a network provides the path needed by applications above it, while it calls the next lower layer to send and receive packets that make up the contents of the path.

One having skill in the art will appreciate that the server 110 may represent only one device of the type that may be connected to a network. Wide area networks such as the Internet may provide connections to a wide variety of devices and other networks, and communications between multiple mobile stations mat be effectuated through an AP without the use of a server.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Polling

Figure 2:
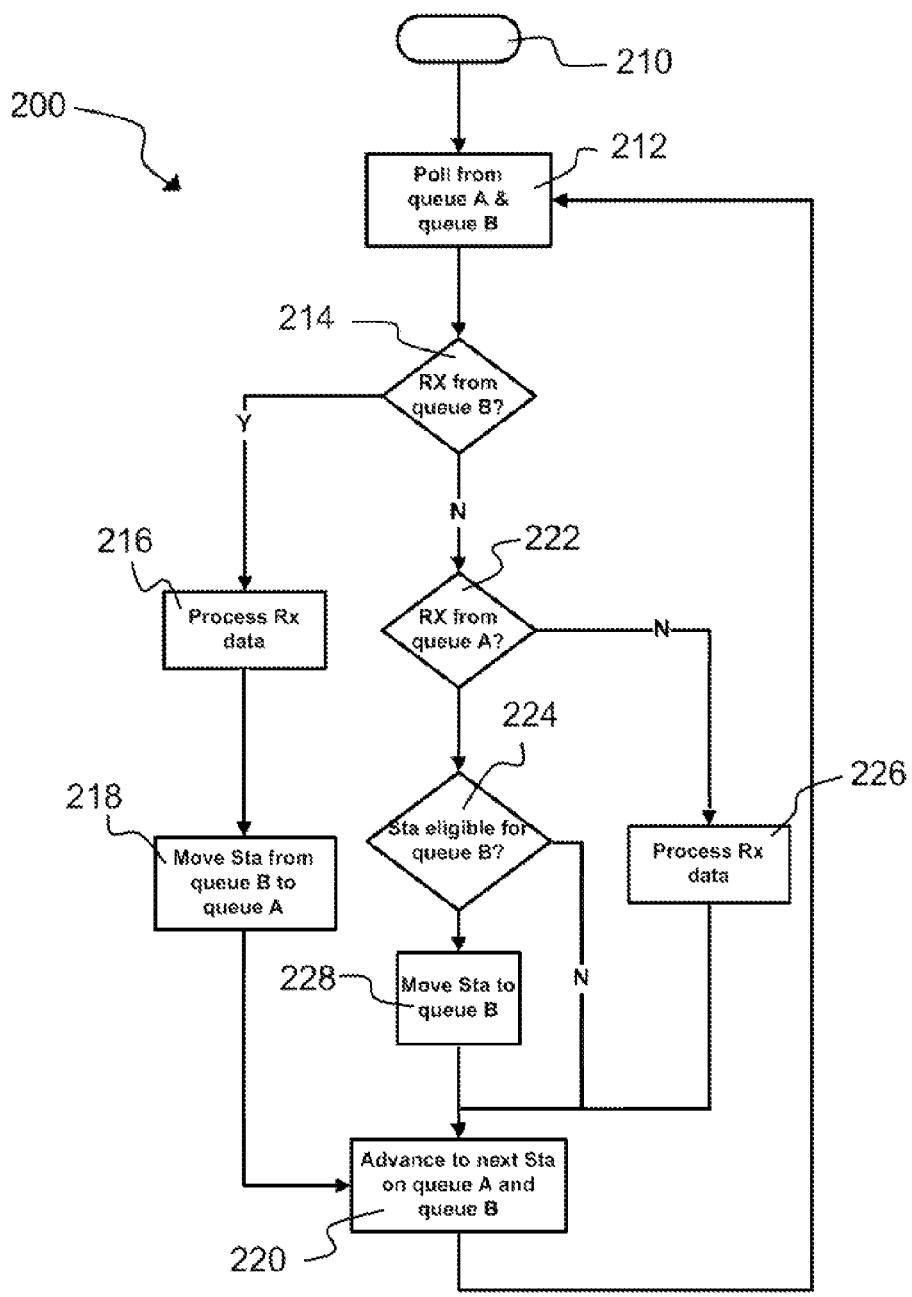
FIG. 2 is a flowchart showing a modified time division multiple access (TDMA) protocol for a communications network.

FIG. 2 is a flowchart showing a modified time division multiple access (TDMA) protocol for a communications network. TDMA is a channel access method for shared medium networks that allows several users to share the same frequency channel by dividing the signal into different time slots. The users transmit in rapid succession, one after the other, each using a predetermined time slot. This allows multiple stations to share the same transmission medium or radio frequency channel while using only a part of its channel capacity.

TDMA may be implemented with multiple mobile stations and an access point wherein the AP acts as a network controller and polls periodically each mobile station. In this implementation, the AP polls each station allowing each mobile station an opportunity to respond. Mobile stations do not transmit until they have been polled by the network controller.

According to the current disclosure, two lists of stations are maintained by the network controller. The lists are managed as a queue such that the network controller can cycle through each station in the lists for successive polling. Generally the first list (queue A) contains contact information for active stations, while the second list (queue B) contains contact information for inactive or reduced activity stations. Contact information may be any identification information used to initiate polling such as a station ID. As each station is polled it is moved from the front of the queue to the rear of the queue.

At a flow marker 210 the method begins. At a step 212 the network controller polls one station from queue A (active stations) and substantially simultaneously (or near in time) polls a second station from queue B (inactive stations). Polling can be performed substantially simultaneously by encoding the polling signal to address both stations. After polling, the network controller waits a predetermined time for a response.

At a step 214, if a signal is received it is tested to see if it came from the station in queue B. If so, operation is transferred to a step 216. At the step 216, the signal is processed by sending data, receiving data or other operations as determined by the network system. Operation continues to a step 218 where the station is moved from the queue B to the queue A, in essence moving the station from the inactive list to the active list. Operation then proceeds to a step 220. At the step 220, the queues are advanced so that different stations may be identified for polling. From the step 220 operation proceeds to the step 212 where the next enqueued stations are polled and the operation proceeds again.

Returning to the step 214, if the received signal is not from the station in queue B, it is tested to see if the received signal is from the station in queue A. If it is, the process is transferred to a step 226 for processing of the received signal from the station in queue A. The signal is processed by sending data, receiving data or other operations as determined by the network system. Operation then proceeds to a step 220 described above.

If a signal is not received from either the station in queue A or queue B, the operation moves to a step 224. At the step 224 the station from queue A is analyzed to test its activity and determine eligibility to be moved from queue A to queue B. If the station in queue A has not responded for a predetermined time, the station is moved from queue A to queue B. The amount of time required for a response may be dynamically calculated. For example, a rolling average of polls and responses for a previous time may be used to predict the behavior of the station in queue A. Simpler methods of prediction may also be sued such as a count of non-responses to polling attempts. However the determination is made, if the station is queue A is determined to be unlikely to respond to an immediate polling, the station is moved to queue B at a step 228.

In operation the protocol of FIG. 2 operates to alleviate the problem of oversubscribing because stations in queue A and queue B may be polled at different rates. Queue A, containing the most active stations, is likely to be shorter than queue B because queue B has the least active stations. The stations in queue A are polled more frequently because of the shorter queue. In the event of a collision, the most active stations will be soon polled again whereas the least active stations, when polled again, will likely be polled with a different station, enhancing the opportunity to connect to the network controller.

The stations having been recently polled are moved to the back of their respective queues. The inventors contemplate operating the queues on a first in first out basis, however one having skill in the art will recognize that different queuing protocols may be effectuated while retaining the same spirit of the current disclosure.

Polling need not always be performed simultaneously. By way of example, an AP may establish a communications link with a wireless station such that data is being transferred between the AP and the wireless station. During transmissions of data from the AP (downlink), the AP can poll one or more stations from the less active queue. In the event one of the less active stations has traffic, it may transmit an indication, thus allowing the station to be moved into the active station queue for further processing. While some collisions may occur, conventional collision correction schemes would allow for recovery.

Data Aggregation

According to the present disclosure, between polling times the mobile station aggregates data to be transmitted so that when the mobile station is polled it can send all aggregated data as a larger data packet. The network controller may poll the mobile station to determine the amount of data the mobile station has to transmit and allocate a transmission time for the mobile station. The transmission time may be based on the amount of data or on the calculated transmission time of the data. This allows for the network controller to allocate time based on the data rate currently available for the mobile station. Aggregation into manageable "chunks" of data allow for the network controller to prioritize and facilitate data flows from differing mobile stations.

Figure 3:
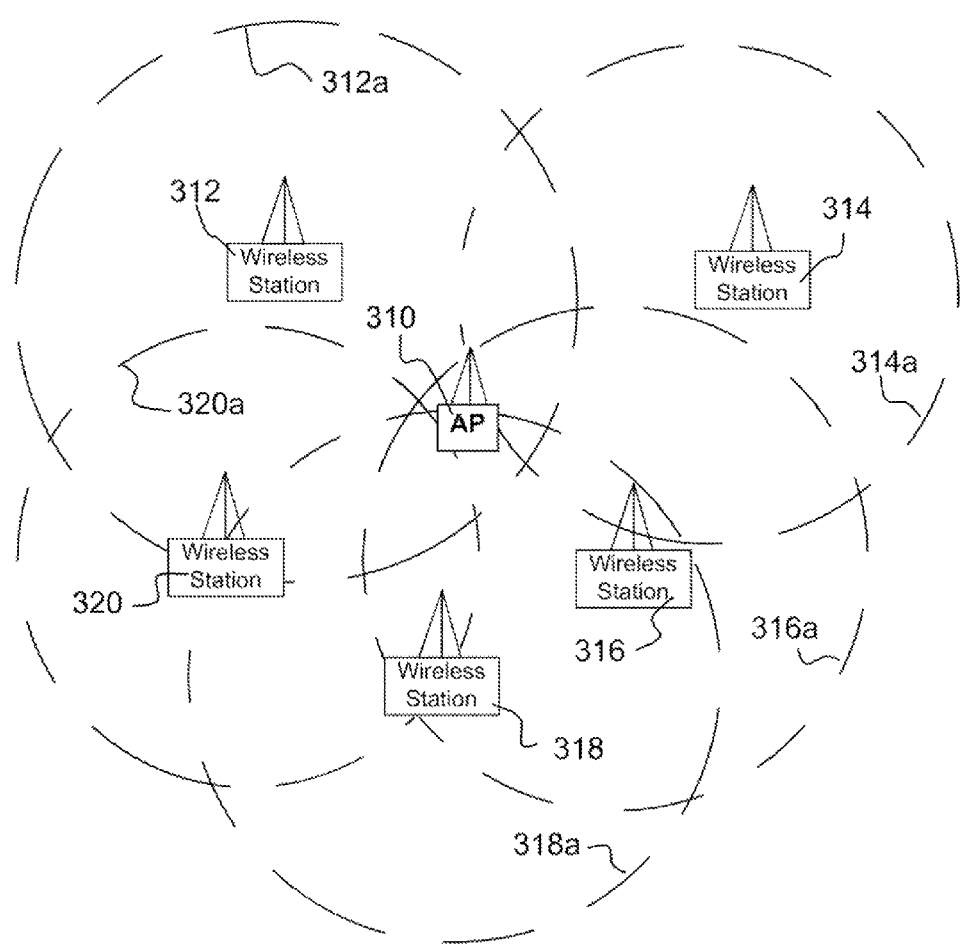
FIG. 3 illustrates a wireless network system.

FIG. 3 illustrates a wireless network. The network has an access point (AP) 310 wirelessly coupled to a group of wireless stations 312-320. Each wireless station 312-320 has a coverage area 312a-320a represented by a dotted line in the FIG. 3. The coverage area represents the distance from the wireless station that the wireless station is capable of communications. The distance is dependant on the wireless stations transmission power, transmission frequency, atmospherics and other generally known radio frequency communication factors. Generally the coverage area is circular, but obstacles may interfere with this shape of the coverage area, and the antenna for each wireless station may be designed to shape the coverage area for a desired affect.

In the FIG. 3 the AP 310 has established wireless communications with each wireless station 312-320. The stations 312-320 generally do not communicate with each other, even though some of their coverage area overlaps. For example, station 312 and station 320 are within each others coverage area, but communicate exclusively with the AP 310. Each station when not communicating with the AP 310 is aggregating data from its respective electronic equipment (not shown). The wireless stations 312-320 are receiving any signal transmitted from the AP 310, but unless the other wireless stations are within their respective coverage areas, the wireless station will not receive a signal from another wireless station. When the AP 310 transmits, each wireless station 312-320 receives the signal, decodes it and determines if the signal is meant for that wireless station. This may be accomplished by transmitting a unique query to the stations to inquire about any data traffic the station has to transmit to the AP. According to one aspect of the disclosure, the AP may query two or more stations simultaneously or in rapid succession. Once a signal is received by that station, and it is determined that the signal is meant for that particular station, the station transmits a reply to the AP. The reply may indicate the amount of data to transmit, or that there is no data traffic to transmit. Alternatively, if there is no data to transmit, the station may forgo transmission.

The AP 310, when it receives a reply from a station, will signal to that station that it may begin to transmit data. The AP may signal a predetermined amount of time or data within which the wireless station must limit its transmission. The wireless station will buffer any data it cannot transmit within the predetermined amount of time and transmit it at the next available opportunity. This allows for the AP to function as a network controller and dynamically control the data flow throughout the network. When used with the other techniques herein described, the AP may provide priority to certain wireless stations by maintaining a queue of priority stations, thus increasing the quality of service for that station. Additionally, the AP may reduce data collisions by varying polling rates and queue management.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A system comprising: a network controller operable to: maintain wireless station identification information in an active queue and an inactive queue; simultaneously poll, on the same frequency, a station from the active queue and a station from the inactive queue, by encoding the polling signal to address both stations; test a received signal to determine if the received signal came from a station in the active queue or the inactive queue; calculate a likelihood of a station to respond to a future polling signal, said calculation including calculating the rolling average of prior response times from the station and move the station to a different queue in response to said calculation, and allocate transmission time for the wireless stations in response to said polling.

2. The system of claim 1 wherein the network controller is an access point and the wireless station is a mobile station.

3. The system of claim 1 wherein the response to said polling includes an indication of either an amount of data or an amount of airtime.

4. The system of claim 1 wherein the network controller is further operable to move identification information between the different queues response to said polling.

5. The system of claim 1 wherein the mobile stations are further operable to aggregate data between polling.

6. The system of claim 1 wherein the network controller is further operable to poll a first wireless station at substantially the same time as transmitting downlink data to a second wireless station.

7. The system of claim 1 wherein the response to said polling includes an indication of wireless station activity.

8. A method comprising: in a data communications device, maintaining wireless station identification information in an active queue; maintaining wireless station identification information in an inactive queue; encoding a polling signal to address a plurality of stations, each of said plurality of stations from a different queue; simultaneously polling, on substantially the same frequency, the plurality of wireless stations using the polling signal; testing a received signal to determine if the received signal came from a station in the active queue or the inactive queue; calculating a likelihood of a station to respond to a future polling signal, said calculating including calculating the rolling average of prior response times from the station; moving the station to a different queue in response to said calculating, and allocating transmission time for the wireless stations in response to said polling.

9. The method of claim 8 wherein the data communications device is an access point and the wireless station is a mobile station.

10. The method of claim 8 wherein the response to said polling includes an indication of either an amount of data or an amount of airtime.

11. The method of claim 8 wherein the data communications device is further operable to move identification information between the different queues response to said polling.

12. The method of claim 8 wherein the mobile stations are further operable to aggregate data between polling.

13. The method of claim 8 wherein the network controller is further operable to poll a first wireless station at substantially the same time as transmitting downlink data to a second wireless station.

14. The method of claim 8 wherein the response to said polling includes an indication of wireless station activity.

15. One or more processor readable storage devices having non-transitory processor readable code embodied on said processor readable storage devices, said processor readable code for programming one or more processors to perform a method comprising: maintaining wireless station identification information in an active queue; maintaining wireless station identification information in an inactive queue; encoding a polling signal to address a plurality of stations, each of said plurality of stations from a different queue; simultaneously polling, on substantially the same frequency, the plurality of wireless stations using the polling signal; testing a received signal to determine if the received signal came from a station in the active queue or the inactive queue; calculating a likelihood of a station to respond to a future polling signal, said calculating including calculating the rolling average of prior response times from the station; moving the station to a different queue in response to said calculating, and allocating transmission time for the wireless stations in response to said polling.

16. The device of claim 15 wherein the response to said polling includes an indication of either an amount of data or an amount of airtime.

17. The device of claim 15 wherein the method further includes moving identification information between the different queues response to said polling.

18. The device of claim 15 further including polling a first wireless station at substantially the same time as transmitting downlink data to a second wireless station.

19. The device of claim 15 wherein the response to said polling includes an indication of wireless station activity.

* * * * *